C. W. DODGE, Jr.
FLUID CLUTCH MECHANISM.
APPLICATION FILED DEC. 11, 1907.
912,938.
Patented Feb. 16, 1909.
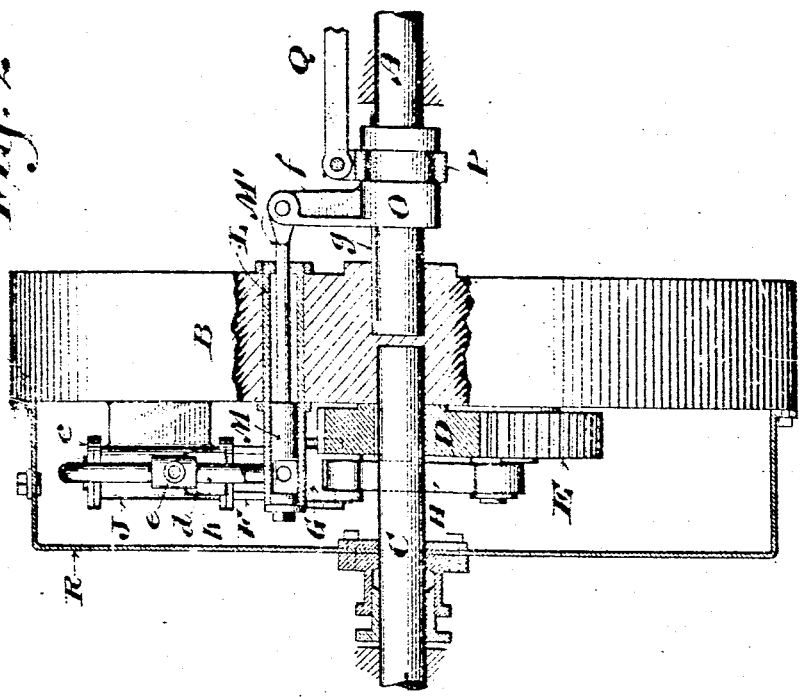
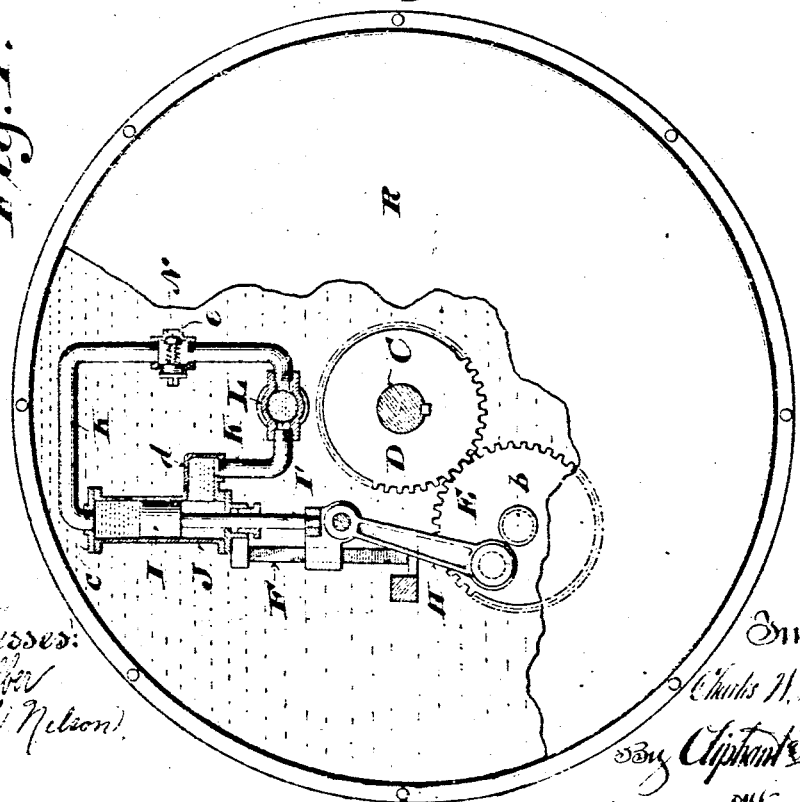
Witnesses:
Geo Felber
Ralph Nelson
Inventor
Charles W. Dodge Jr.
By Oliphant & Young
Attorneys.

UNITED STATES PATENT OFFICE.

CHARLES W. DODGE, JR., OF MILWAUKEE, WISCONSIN, ASSIGNOR OF ONE-HALF TO JOHN HERBERT FARRELL, OF DENVER, COLORADO.

FLUID-CLUTCH MECHANISM.

No. 912,928.   Specification of Letters Patent.   Patented Feb. 16, 1909.

Application filed December 11, 1907. Serial No. 406,022.

*To all whom it may concern:*

Be it known that I, CHARLES W. DODGE, Jr., a citizen of the United States, and resident of Milwaukee, in the county of Milwaukee and State of Wisconsin, have invented certain new and useful Improvements in Fluid-Clutch Mechanism; and I do hereby declare that the following is a full, clear, and exact description thereof.

My invention has for its object to provide simple, economical and efficient fluid clutch-mechanism by which a driven-shaft may be started from rest and gradually speeded to finally attain the same speed as a drive-shaft that has been rotating during the entire operation at practically constant speed; said invention consisting generically and specifically in what is hereinafter particularly set forth with reference to the accompanying drawings and also hereinafter claimed.

Figure 1 of the drawings represents a partly sectional end elevation of a fluid-clutch mechanism in accordance with my invention, and Fig. 2, a partly sectional side elevation of said mechanism.

Referring by letter to the drawings, A indicates a drive-shaft of an engine, motor or other prime mover, and keyed or otherwise rigidly secured to the same is a support B of preferably annular form, which support may be the fly-wheel of an explosive engine. Loose at one end in a socket of the support B is a driven shaft C alined with the drive-shaft and keyed or otherwise rigidly secured on the driven-shaft is a gear D in mesh with a similar gear E that turns on a lateral stud $b$ of said support. The support aforesaid is provided with a guide-frame F for a cross-head G, and a pitman H connects the gear E with the cross-head. The rod I' of a piston I is also connected to the cross-head, and the piston has its reciprocation in a cylinder J in connection with the aforesaid support, the piston-rod being extended through a stuffing-box and gland at one end of the cylinder. A circulating conduit K, in connection with a head $c$ and a lateral extension $d$ of the cylinder, is interrupted by a casing L containing a slide valve M that controls ports of said casing in register with attached branches of said conduit. The casing and valve are preferably cylindrical, and said casing extends through the support B aforesaid in which it is rigidly secured by suitable means. One branch of the conduit K between the cylinder-head $c$ and the plug-valve casing L, is provided with a check-valve N controlling a port $e$ in said conduit.

The cylinder J and piston I constitute a double-acting pump designed to effect a circulation of fluid in the conduit K, unless this circulation is stopped by an adjustment of the slide-valve M, the stem M' of this valve being preferably in connection with an arm $f$ of a collar O in sliding engagement with the drive-shaft A and a spline $g$ of same, this collar being provided with an annular groove engaged by a spanner-ring P that is connected by a link Q with a lever or other controlling device.

In fluid-tight connection with one side of the support B is a casing R through which the driven-shaft extends, a stuffing-box and gland for said shaft being provided. The casing is designed to be filled, through a normally closed aperture therein, with a fluid, preferably oil, in which case an oil-bath is provided for the gearing and other incased parts of the mechanism, and the fluid-contents of said casing are drawn into the circulating system, comprising the pump and conduit, through the valve-controlled port $e$ of said conduit, said circulating system being always filled with said fluid.

If the drive-shaft A be rotating and the driven shaft C at rest, the slide-valve will be adjusted to open the ports of the casing L, in which said valve has its play, so as not to interfere with the fluid in the circulating system, and the gear E will turn freely on its own axis and roll around the circumference of the gear D with which it is meshed. Hence the pump is operating to move the fluid back and forth in the conduit. Now supposing the slide-valve is adjusted to gradually close the ports in its casing, there will be an increase of resistance to the motion of the pump-piston, thus tending to prevent rotation of the gear E on its axis, until eventually a turning movement is exerted on the gear D sufficient to overcome the resistance applied to the gear aforesaid, and thereafter both gears begin to rotate in the same direction as the rotary support B, until said ports are entirely closed by said slide-valve. At this time both of the gears become fixed with respect to the rotary support, and the driven shaft is running at the same speed as the drive-shaft, said driven shaft having started from rest and gradually attained its full speed without jar or appreciable diminution of the speed of said drive-shaft.

I claim:

1. The combination of a drive-shaft, a support in rigid connection with the shaft, a driven-shaft, a gear fast on the driven-shaft, another gear normally loose on a stud of the support in mesh with the gear aforesaid, a pump attached to said support and having its piston in pitman-connection with the gear on said stud, a fluid-container also connected to the aforesaid support in communication with the pump, and a cut-off controlling the fluid-circulation.

2. The combination of a drive-shaft, a support in rigid connection with the shaft and provided with a guide-frame and stud, a driven shaft having a gear fast thereon, another gear normally loose on said stud in mesh with the gear aforesaid, a cross-head loose on the guide-frame, a double-acting pump attached to the support and having its piston in connection with the cross-head, a circulating-conduit connected to the pump and having an inlet controlled by a check-valve, a casing in connection with said support and having ports in register with attached branches of the conduit which it interrupts, a valve in the casing constituting an adjustable cut-off for said ports, and a fluid-container attached to the aforesaid support to incase the gearing, pump and the mechanism aforesaid.

In testimony that I claim the foregoing I have hereunto set my hand at Milwaukee, in the county of Milwaukee and State of Wisconsin in the presence of two witnesses.

C. W. DODGE, Jr.

Witnesses:
N. E. OLIPHANT,
GEORGE FELBER.